United States Patent [19]
Yoshida

[11] Patent Number: 5,752,060
[45] Date of Patent: May 12, 1998

[54] FILE ACCESS SCHEME IN DISTRIBUTED DATA PROCESSING SYSTEM

[75] Inventor: Hiroshi Yoshida, Mishima, Japan

[73] Assignee: Fujitsu Limited, Kawasaki, Japan

[21] Appl. No.: 364,385

[22] Filed: Dec. 23, 1994

Related U.S. Application Data

[63] Continuation of Ser. No. 62,252, May 17, 1993, abandoned, which is a continuation of Ser. No. 707,832, May 30, 1991, abandoned.

[30] Foreign Application Priority Data

May 30, 1990 [JP] Japan .................... 2-140906

[51] Int. Cl.⁶ ............................................ G06F 13/14
[52] U.S. Cl. .............. 395/800; 395/200.01; 364/242.94; 364/282.1; 364/DIG. 1
[58] Field of Search ...................... 395/800, 200, 395/600, 200.01; 364/242.94, 282.1, DIG. 1

[56] References Cited

U.S. PATENT DOCUMENTS

| | | | |
|---|---|---|---|
| 4,371,929 | 2/1983 | Brann et al. | 395/865 |
| 4,769,772 | 9/1988 | Dwyer | 395/600 |
| 4,901,231 | 2/1990 | Bishop et al. | 364/200 |
| 4,914,571 | 4/1990 | Baratz et al. | 395/600 |
| 4,924,384 | 5/1990 | Hao et al. | 364/200 |
| 5,008,853 | 4/1991 | Bly et al. | 364/900 |
| 5,012,405 | 4/1991 | Nishikado et al. | 395/600 |
| 5,084,815 | 1/1992 | Mazzario | 395/800 |
| 5,163,131 | 11/1992 | Row et al. | 395/200 |

FOREIGN PATENT DOCUMENTS

| | | |
|---|---|---|
| 0 193 933 | 9/1986 | European Pat. Off. |
| 0 216 253 | 4/1987 | European Pat. Off. |
| 0 313 668 | 5/1989 | European Pat. Off. |
| 0 345 738 | 12/1989 | European Pat. Off. |

*Primary Examiner*—Alyssa H. Bowler
*Assistant Examiner*—John Harrity
*Attorney, Agent, or Firm*—Staas & Halsey

[57] ABSTRACT

A file access scheme in a distributed data processing system for executing an access to a file in response to a file server to effect a data processing includes a device for executing an input/output processing such that each processing module unit operates as a subroutine of a data processing unit and executes input/output processing to the file controlled by itself and a device for executing data transfer processing such that the processing module unit operates as a subroutine of the data processing unit and implements a data transfer processing between the processing module unit and the file server of other processing modules.

1 Claim, 7 Drawing Sheets

Fig. 3(a)

1. OPEN INSTRUCTION PROCESSING FUNCTION
2. DATA TRANSFER FUNCTION
3. INPUT/OUTPUT OPERATION CONTROL FUNCTION

Fig. 3(b)

1. PROGRAM INTERFACE FUNCTION
2. INPUT/OUTPUT OPERATION CONTROL FUNCTION

Fig. 3(c)

1. PROGRAM INTERFACE FUNCTION
2. DATA TRANSFER FUNCTION

FILE ACCESS SCHEME IN DISTRIBUTED DATA PROCESSING SYSTEM

This application is a continuation of application Ser. No. 08/062,252, filed May 17, 1993, now abandoned and which is a continuation of application Ser. No. 07/707,832, filed May 30, 1991, now abandoned.

BACKGROUND OF THE INVENTION

1. Field of the Invention

The present invention relates to a file access scheme in a distributed data processing system for executing data processing whereby a plurality of processing modules having a distributed constitution creates access to a file in response to a file server, and more particularly to a file access scheme for enabling the execution of high speed file access.

2. Description of the Related Art

In a distributed data processing system in which a plurality of processing modules are coupled by a bus, a local area network (abbreviated by LAN) or communication channels, an application program that operates on a processing module processor must be able to create an access to a file of a disk for storing a self processing module but also for storing other processing modules. A method of applying a file server thereto is widely used, to enable such an access.

A file server is regarded as an apparatus for providing a large number of magnetic disc units able to share a plurality of workstations in a LAN system. If each of the work stations creates an access to a file server in the system, the programs or data made by other work stations are utilized. The procedure for gaining access to the file server is different for operating system, for example, an MS-Network in MS-DS, LAN Manager in OS/2, an NFS in UNIX or the like.

As shown in FIG. 1, in a file access system using a file server, there is a file server for accessing a disk file with which each processing module is equipped. Communication is executed between the file server and an application program from a requester to gain access to all the files with which a system is equipped.

With regard to an application program unit which is operated on a processor for each processing module, when it is necessary to read file data, the application program unit communicates with a file server for processing a module from a disk in which a file required to be accessed is stored. Then, when a file server belongs to any other processing module unit, file data is obtained by implementing a read operation of the file server, via a loosely coupled communication channel between the processing module units, and when the file server belongs to the same processing module unit, via a memory within a processing module unit (copying among memories). When it is necessary to write a file data, the application program unit communicates with a file server for processing a module that a disk for storing the file to be accessed, exists thereat. Then, when the file server belongs to any other processing module unit, the above file data is used, via a coupled communication channel between processing module units. When the file server belongs to the same processing module unit, via the memory within a processing module unit, to be transmitted to execute communication processing.

In such prior art, even when an application program from a requester is accessed to a disk file in the same processing module, such a procedure is adopted so as to make an access thereto via a file server which is equipped in the same processing module unit. But if it is an access to a file within the same processing module unit, a data area within an application program is used directly as an input/output buffer to be able to execute an input/output operation for a disk. In a conventional technique, since it is used via a file server, it is a controversial point to take extra time such as overhead time for transferring data between a file server and a data area for the application program unit or overhead time for a communication protocol.

That is, in a prior art, since an access function is effected between processing modules for a distributed data processing system, there is a problem that access performance of a disk file within the same processing module unit which was expected to be executed with high speed could be adversely affected.

In order to solve such drawbacks, it is advised that a method is adopted which is directed to respond thereto by recognizing a file location by means of an application program. By doing so, a new problem may occur whereby the creation of an application program and the degree of freedom of varying a file location may be adversely affected.

SUMMARY OF THE INVENTION

It is an object of the present invention to provide an improved file access scheme in a distributed data processing system which enables high speed access to a file, without affecting the creation of an application program and the degree of freedom of varying a file location.

In accordance with a feature of the present invention, there is provided a file access scheme in a distributed data processing system for executing access to a file in response to a file server to effect a data processing and includes:

a unit for executing input/output processing such that each processing module unit operates as a subroutine of a data processing unit and executes input/output processing to the file controlled by itself; and a second unit for executing data transfer processing such that the second unit operates as a subroutine of the data processing unit and executes a data transfer processing between the means and the file server of other processing modules. The file server of each processing module, in the case of an open instruction to the file, according to whether the data processing unit belongs to the same processing module to which the processing module or to another processing module belongs, calls the input/output processing unit or the data transfer unit of the processing module to execute a binding between the data processing unit and the file.

BRIEF DESCRIPTION OF THE DRAWINGS

FIGS. 3(A) to 3(C) are block diagrams showing a function of a file server (FIG. 3(A)), an input/output processing unit (FIG. 3(B)) and a data transfer unit, respectively, in FIG. 2, in accordance of the present invention.

DESCRIPTION OF THE PREFERRED EMBODIMENT

The present invention will be described in detail, partly in comparison with a prior art, with reference to the appended drawings.

Figure 1:
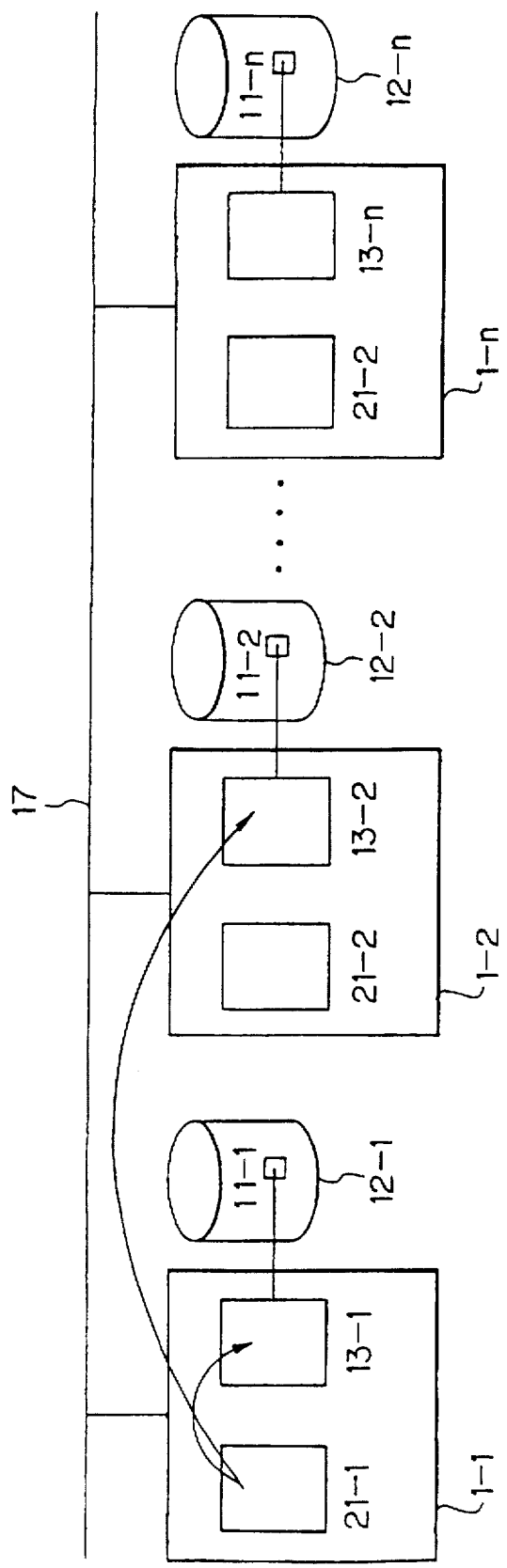
FIG. 1 is a block diagram showing a prior art file access system using a file server.
Figure 2:
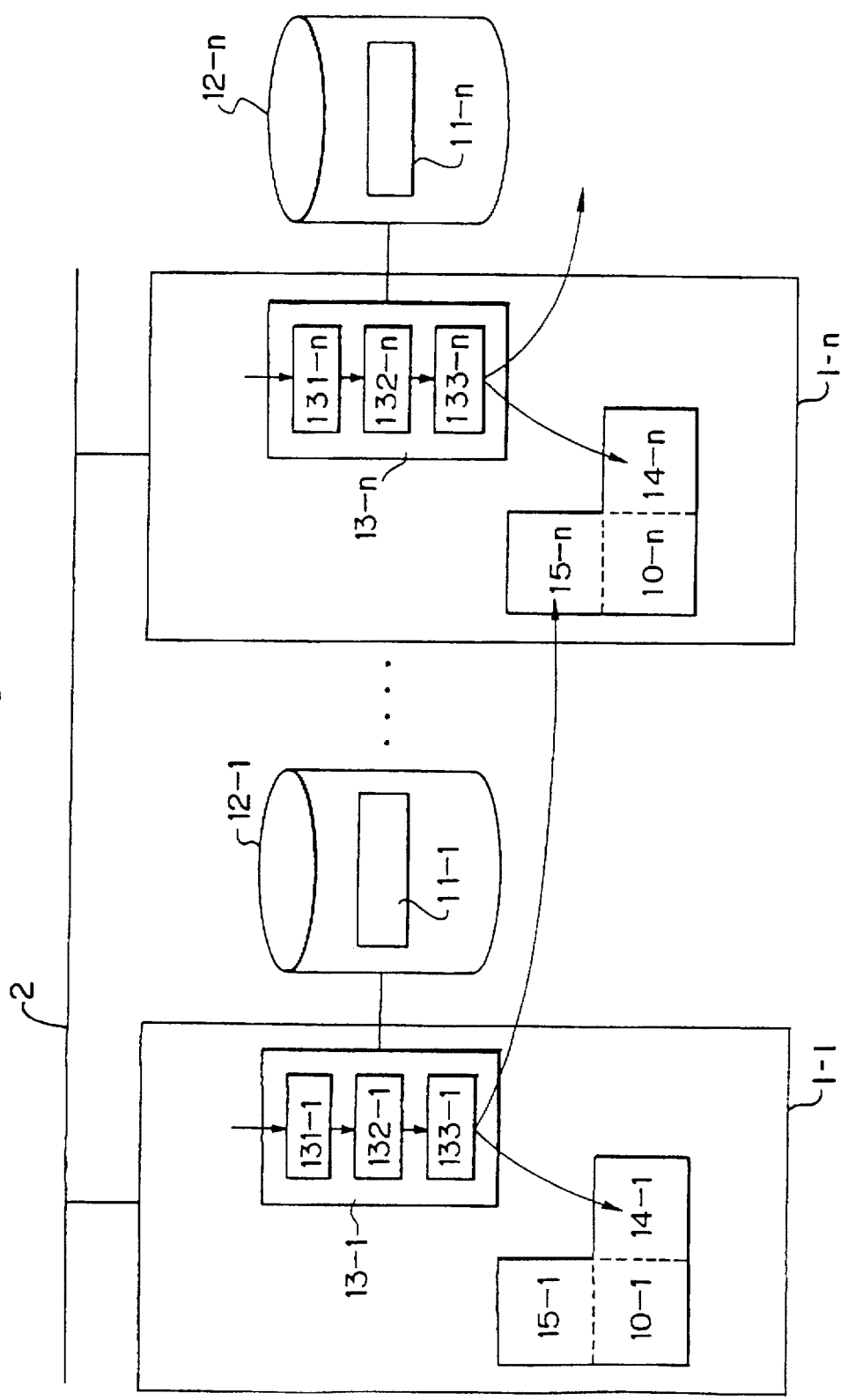
FIG. 2 is a schematic block diagram showing an embodiment of a file access scheme in a distributed data processing system for executing data processing, in accordance with the present invention.

FIG. 2 illustrates a schematic block diagram of an embodiment in accordance with the present invention. In FIG. 2, reference numerals 1-1 to 1-n denote processing modules, 11-1 a file, and 12-1 a disk. In FIG. 2, 1-i (i=1–n) are a plurality of data modules forming a distributed data processing system and 2 is a network connecting between a plurality of processing modules. Each of processing modules 1-i (i=1–n) includes a data processing unit 10-i, a file 11-i, a disk 12-i, a file server 13-i, an input/output processor unit 14-i and a data transfer unit 15-i.

While a data processing unit 10-i is referring to data of a file 11-i in the processing module unit 1-i to which it belongs and data of a file 11-i in other processing module 1-j (j≠i), a predetermined data processing is effected.

A file 11-i is processed to distribute and control data which the data processing unit 10-i needs. A disk 12-i stores the file 11-i. A file server 13-i is processed such that an access control of a processing module unit to which it belongs 1-i to the file 11-i is effected. An identifier of module for an open instruction is input to the file server 13-i and transmitted one by one via an open instruction receiving unit 131-i, a requester module discriminator unit 132-i, and an open instruction demand processor unit 133-i, to send the output of 133-i to an input/output processing unit 14-i and a data transfer unit 15-i, respectively.

An input/output processing unit 14-i operates as a subroutine of the data processing unit 10-i in the processing module unit to which it belongs 1-i and executes an input/output processing to a file 11-i in the processing module unit to which it belongs 1-i.

A data transfer unit 15-i operates as a subroutine of the data processing unit 10-i in the processing module unit to which it belongs 1-i and executes a data transfer between the file servers 13-j in other processing module 1-j (j≠i) and the data transfer unit 15-i. In this case, an interface for calling operation of the input/output processing unit 14-i and the data transfer unit 15-i (a sequence of arguments numbers or the like) is, preferably, formed by the same format viewed from the data processing unit 10-i and even if both are different, the interface is constituted such that the difference therebetween will do.

The file server 13-i is comprised of an open instruction receiving unit 131-i for receiving an open instruction to the file 11-i, a requester module discriminator unit 132-i for discriminating processing module identifiers (j) from a requester concerning a received open instruction, and a binding processing unit 133-i for processing a binding with a data processing unit 10-j of an open instruction requester and the file 11-i of the requester. In this case, a binding processing is effected by an operation that, according to an identifier of discriminated processing modules, a call of the input/output processing unit 14-i in the processing module unit to which it belongs 1-i can be designated or, a call of the data transfer unit 15-j in the other processing module 1-j (j≠i) can be designated. Thereby, a binding of a data processing unit 10-j of an open instruction requester with a file 11-i of a request destination or client can be effected.

In accordance with the present invention, when a file server 13-i receives an open instruction to a file 11-i from a data processing unit 10-j (j=i or j≠i), a requester module discriminating unit 132-i discriminates whether the data processing unit 10-j of the received open instruction requester may belong to the processing module unit to which it belongs 1-i or not, from an identifier of a requester data processing unit 10-j attached to an open instruction. Based on the result of the discrimination, if it is determined that it belongs to the processing module unit to which it belongs 1-i, that is, when a condition i=j is determined, a file server 13-i does not effect an open processing with a file 11-i as an open instruction client, but designates a call of an input/output processing unit 14-i in the above processing module unit 1-i. Upon receiving this designation or indication, the data processing unit 10-i of an open requester employs a self data area, according to a processing of the input/output processing unit 14-i and executes an input/output demand for a disk 12-i to effect access processing to the file 11-i.

On the other hand, when a data processing unit 10-j of an accepted open instruction requester indicates that it does not belong to the same processing module unit 1-i; that is, it is determined that i is not equal to j (i≠j), a file server 10-i effects an open processing to a file 11-i as an open client and requests a call of data transfer unit 15-i in a processing module unit 1-j of an open instruction requester. Receiving this instruction, the data processing unit 10-j of an open instruction requester effects a data transfer operation between the file servers 13-i binding with the file 11-i for an open instruction client according to a processing of a data transfer unit 15-j, to execute an access processing to the file 11-i.

From the above description, in accordance with the present invention, when the file 11-i in a distributed data processing system is accessed according to a file server 13-i, since the file 11-i existing in the disk 12-i within the same data processing module 1-i is accessed thereto without using the file server 13-i, it is advantageous that an access to the file 11-i can be executed faster than ever.

With reference to an embodiment, the present invention will be described more in detail.

As shown in FIG. 2, in accordance with the present invention, when an open instruction of a file 11-i is made to a file server 13-i in a processing module unit 1-i which is part of a distributed data processing system, and the data processing unit 10-j which has submitted the open instruction belongs to the same processing module unit to which it belongs 1-i, that is, i=j, the activation of an input/output processing unit 14-i ready for the data processing unit 10-i as a subroutine is designated. Thereby the data processing unit 10-i which has submitted the open instruction employs its self data area and executes an input/output request for the disk 12-i to effect an access processing to the file 11-i.

The open instruction for such file server 13-i will be started after completion of a process that a data processing unit 10-j of an open instruction requester submits a data access request message required to a control server (not shown in FIG. 2). When the control server accepts the data access request message, the file 11-i which controls the data is determined to specify thereof, an open instruction message is submitted to the file server 13-i which effects an access processing of the specified file 11-i.

In case of submitting the open instruction, according to the present invention, there is provided, as a function of an operating system, a constitution such that an identifier of a processing module unit 1-j, in which a data processing unit 10-j exists, may be informed. When the data processing unit 10-j submits a data access request message, only if a structure is ready which provides an identifier of a processing module 1-i that the data processing unit 10-j exists, a constitution is adopted such that, together with an open instruction message, an identifier of the processing module 1-j in which a data processing unit 10-j of an open instruction requester exists, is informed.

FIG. 3(A) illustrates a block diagram showing a function of a file server 13-i in accordance with the present invention, FIG. 3(B) a block diagram showing a function of an input/output processing unit 14-i as shown in FIG. 2, and FIG. 3(C) a block diagram showing a function of a data transfer unit 15-i as shown in FIG. 2, respectively.

As shown in FIGS. 3(A) to 3(C), an file server 13-i embodying the present invention, includes: a unit for processing an open instruction to a file 11-i for making an objective to a self access processing; a unit for transferring data from/to the subroutine, for carrying out data transferring to a data transfer unit 15-j in other processing modules 1-j therebetween; and a unit for controlling an input/output operation for a file 11-i making an objective to a self access processing.

An input/output processing unit 14-i which is provided as a subroutine of the data processing unit 10-i, functions as an interface for the data processing program and has the function of controlling an input/output operation for controlling an input/output operation of a processing module unit to which it belongs 1-i to the file 11-i.

A data transfer unit 15-i which is provided as a subroutine of the data processing unit 10-i functions as an interface to the data processing unit 10-i therebetween and has the function of transferring data between an other processing module 1-j and a file server 13-j.

Figure 4:
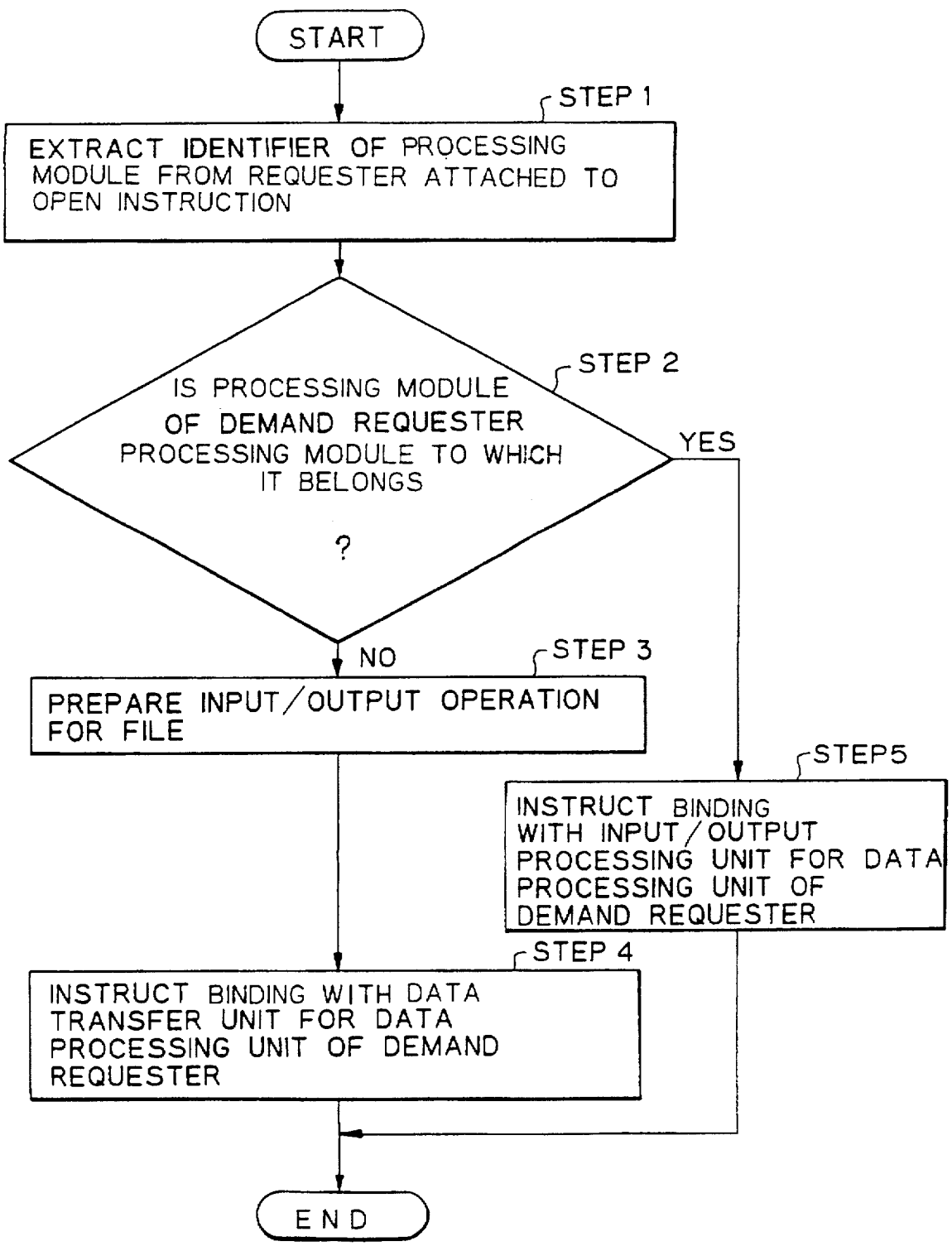
FIG. 4 is a flow chart of a processing function of an open instruction by means of a file server in FIG. 3(A).
Figure 5:
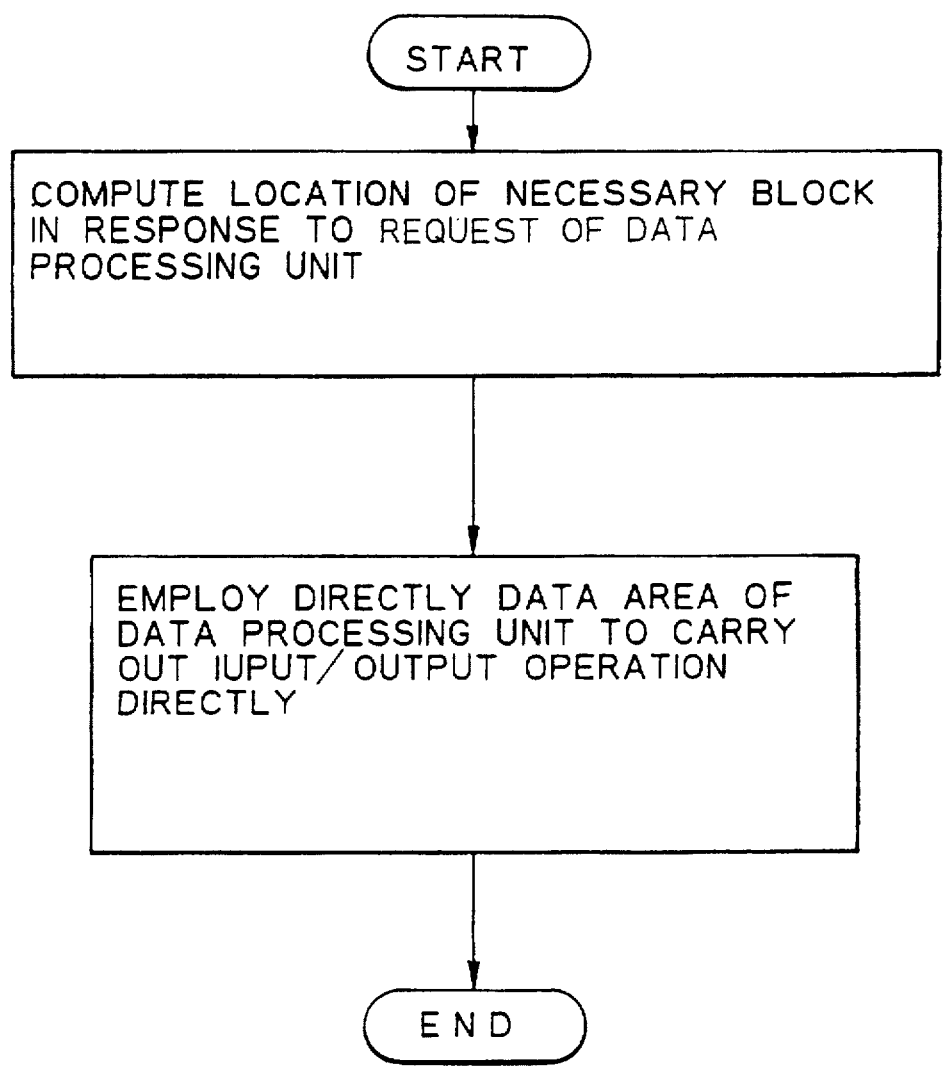
FIG. 5 is a flow chart of an input/output processing unit in FIG. 3(B).

FIG. 4 illustrates a flow chart of a processing function of an open instruction by a file server 13-i. FIG. 5 a flow chart of an input/output processing unit 14-i, and FIG. 6 a flow chart of a data transfer unit 15-i, respectively.

The details of processing the present invention will be described according to the flow charts in FIGS. 4 to 6.

After an open instruction message to a file 11-i has been accepted via the above-described control server, as shown in FIG. 4, a file server 13-i extracts, first of all, in step 1, an identifier of a processing module 1-j, which includes a data processing unit 10-j of an open instruction requester and is attached to the open instruction message. Next, in step 2, according to the extracted identifier, the data processing unit 10-j of the open instruction requester discriminates whether or not it belongs to a processing module unit to which it belongs 1-i. Based on a judgment of step 2, when it is judged that it does not belong to the above processing module unit 1-i, that is, i≠j, the file server 13-i proceeds to step 3 to prepare for an input/output operation for a file 11-i. Then, in step 4, a call of a data transfer unit 15-j which is ready for a subroutine of the data processing unit 10-j is instructed.

Figure 6:
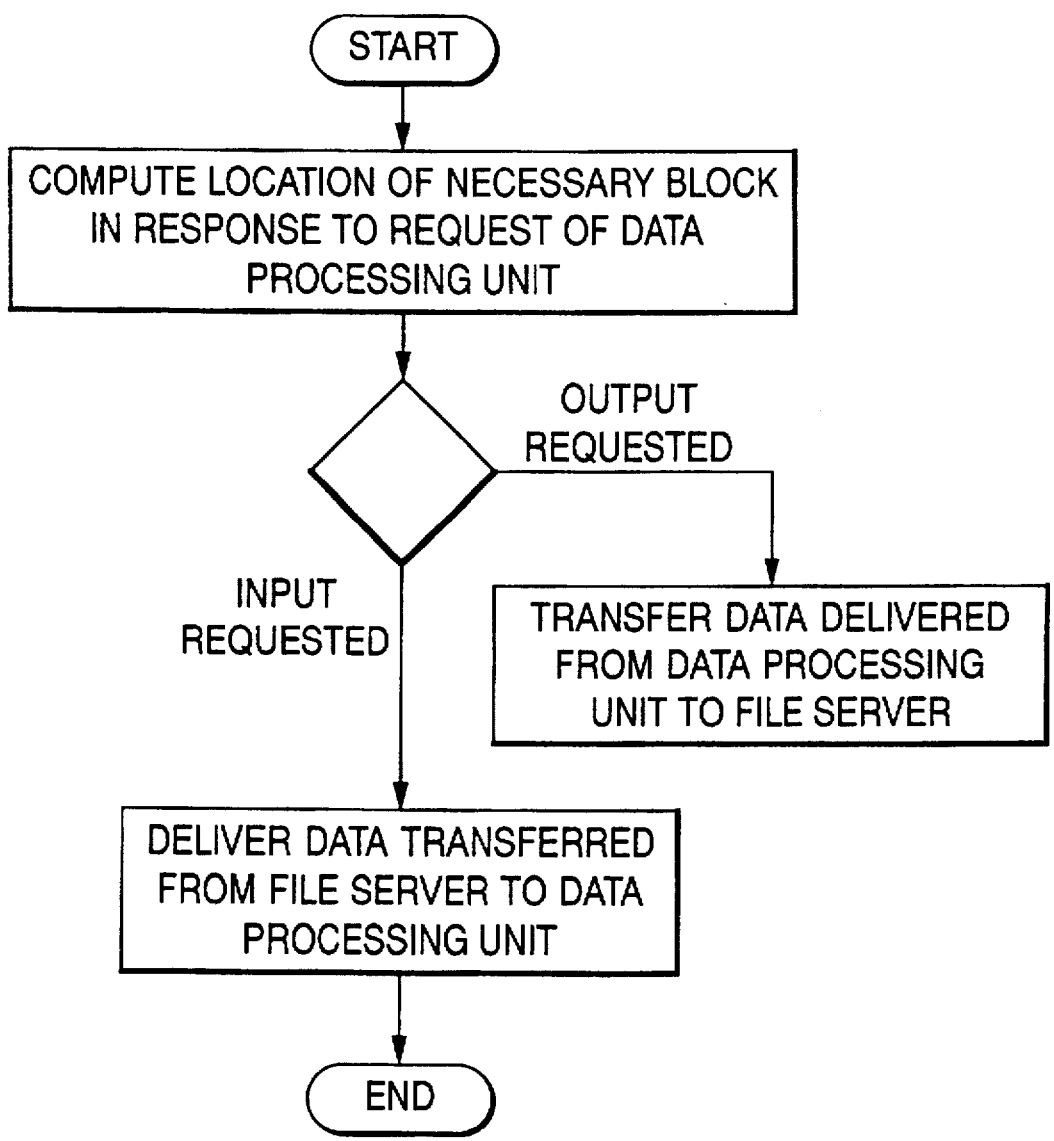
FIG. 6 is a flow chart of a data transfer unit in FIG. 3(C).

Thus, once called, as shown in FIG. 6, the data transfer unit 15-j is executed to compute the location of necessary blocks in response to a request of the data processing unit 10-j of an open instruction requester. If it is a request for an output, data delivered from a data processing unit 10-j is transferred to a file server 13-i as a destination of binding and if it is a request for an input, data transferred from a file server 13-i as a destination of binding is delivered to a data processing unit 10-j. Thus, an access processing to the file server 13-i of an open instruction client.

On the other hand, from a judgment of step 2 in FIG. 4, when it is judged that the data processing unit 10-j of an open instruction requester belongs to a processing module unit to which it belongs 1-i, that is, i=j, then step 2 proceeds to step 5 and a call of an input/output processing unit 14-i which is ready for a subroutine of the data processing unit 10-i is instructed to the data processing unit 10-i of the open instruction requester.

When it is called as above, as shown in FIG. 5, after the input/output processing unit 14-i computes a location of necessary blocks in response to a request of the data processing unit 10-i of an open instruction requester, a data area of the data processing unit 10-i is used directly to execute an input/output operation and execute access processing to the file server 13-i of an open instruction client.

Regarding a file 11-i which exists in a disk 12-i within the same processing module 1-i, a data processing unit 10-i can create an access thereto without via a file server 13-i.

Figure 7:
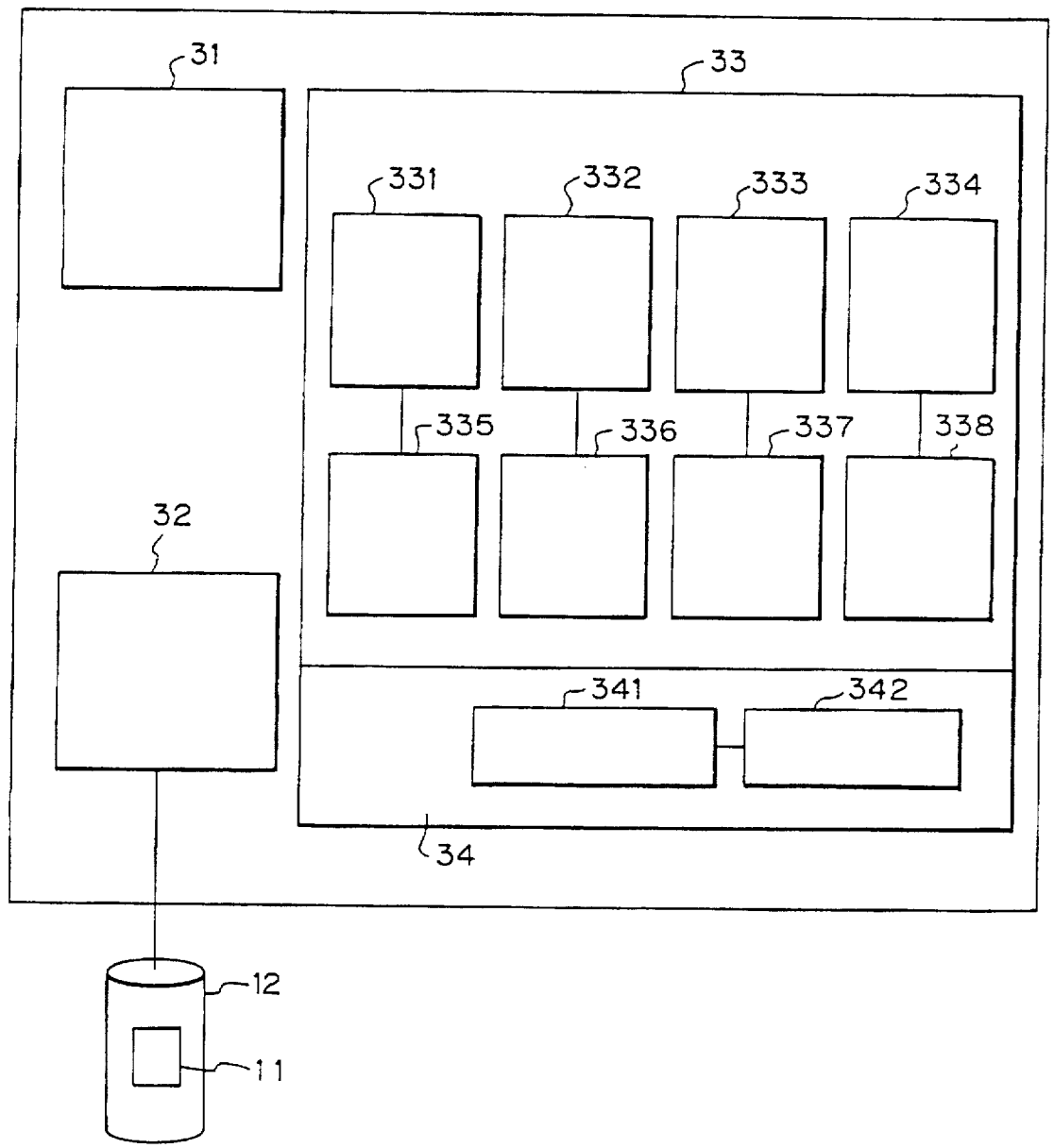
FIG. 7 is a schematic block diagram of a hardware of a processing module for executing the file access scheme in FIG. 2.

FIG. 7 illustrates a block diagram of a hardware of a processing module.

In FIG. 7, reference numeral 31 denotes a CPU and 32 an input/output adapter. A CPU 31 and an input/output adapter 32 are sharing a local memory 33 and a disk 12 which contains a file 11 are connected to the input/output adapter 32.

A local memory 33 includes a server program 331, an input/output processing unit program 332, a data transfer unit program 333 and an application program 334 which requests an access to file, and further four items 335 to 338 and a kernel 34.

Reference number 335 contains a file server buffer, a request control table, a transfer control table and a message buffer, 336 a record control table and a request control table, 337 a request control table, a working memory and a message buffer, and 338 a data area of a requester and a file descriptor, and each of these four items 335, 336, 337 and 338 is associated with the server program 331, the input/output processing unit program 332, the data transfer unit program 333 and the application program 334, respectively. A kernel 34 contains an input/output supervisor program 341 which is associated with an input/output request control table 342.

Referring to FIG. 2 and FIG. 4 to 6, the operation of FIG. 7 will be described in line with a processing flow of a file server, an input/output processing unit and a data transfer unit.

Prior to the description of the processing of a file server in FIG. 4, a processing flow of the file server will be described.

The content of an open request includes the following:

(a) a name of file to be opened (b) an open mode (input or output)

(c) a user name (for checking an access right)

(d) a processing module identifier for effecting an operation of a requester program (reference numeral for representing a processing module).

The above-mentioned information is transferred as a definite information of scores of bytes regarded as a message packet via a bus, a LAN or a communication channel. The content of the open request is put in an address space to which a file server can refer.

The process of a file server will be described in detail according to the following process.

After a start process, the following five processes are effected.

ST1-1: Parameters such as a file name are fetched from a message packet.

ST1-2: Originated from a file name, a file area address or an access right data or the like is retrieved from a file directory.

ST1-3: Originated from a user name, an open mode and an access right data, an existence of an access right is checked.

ST1-4: Obtaining a lock to a file, an access from others is restricted not to destory the consistence of the file.

ST1-5: A processing module identifier of a requester is fetched from among the message packets.

Next, in Step 2, according to the fetched processing module identifier, whether the processing module of a requester is the same as a private operating processing module, is discrimated.

When YES, in Step 5, a file area address on a disk is informed to an input/out supervisor to create a control table necessary to issue an input/output request.

Next, in an address space of a requester program, a control table for controlling a record in a buffer or a control table for controlling a program request is created and a pointer to the control table necessary to issue an input/output request is stored.

Then, a set of control table address (a file descriptor) in combination of an address of the said control table and an entry point address of a module in the input/output processing unit is informed to a requester program.

When NO, in Step 3, a file area address on a disk and a buffer area address in an address space of the file server are informed to an input/output supervisor to create a control table necessary to issue an input/output request.

Then, in the address space of a file server, a control table for controlling a record in a buffer, a control table for controlling a program request and a control table for controlling a transfer state of data.

Next, in Step 4, a message packet in which the address of the above control tables is stored is returned to the requester. The process of Step 4 terminates and waits for a new message.

In this case, a processing of a file server has been terminated, but an open request subroutine of processing module of requester effects the following processing processes.

The open request subroutine receives a reply message packet.

Then, a control table for controlling a program demand in an address space of the requester program is created to store an address of the replied control table of the file server and a working memory necessary to a data transfer is secured.

Then, a set of control table address (a file descriptor) in combination of an address of the above-mentioned control table and an entry point address of a module in the data transfer unit is informed thereto, and thus the process of a file server terminates.

A processing flow of an input/output processing unit will be described in detail.

The contents of an access request includes the following items:

(a) a file descriptor
(b) a discrimination whether it is an input or an output (read/write demand)
(c) an address to a data storing area from a program
(d) a key/record number for an input/output record (in case of a random access).

Processing of the input/output processing unit flows as follows.

Receiving an address of a control table from a file descriptor, a result of control is delivered to a module therein to transfer the result of control to the present module.

Then, based on a key/number of a record required by the program, an address of a block to be input or output on a disk is calculated.

An address in a data storing area of the program, a block address, an operation module such as an input or an output, and a control table address for issuing an input/output request are assigned to call an input/output supervisor.

Then, the input/output supervisor activates an input/output request to a disk unit to executes a data transfer to the data storing area of the program.

Based on a result of an end of an input/output operation, a notification of status of the disk or a fetch of a necessary record from the block is carried out to make the control return to a request program, whereby the process is terminated.

A processing flow of a data transfer unit will be described in detail.

The contents of an access request includes the following items:

(a) a file descriptor
(b) a discrimination between an input or an output (read/write demand)
(c) an address to a data storing area from a program
(d) a key/record number for an input/output record (in case of a random access).

A processing of the data transfer unit flows as follows.

After a start process, the following processes are effected.

Receiving an address of a control table from a file descriptor, a result of control is delivered to a module therein to transfer the result of control to the present module.

In the data transfer unit, whether it is a SEQUENTIAL ACCESS or not is tried. When YES, an address on a disk of the next block is calculated, since the unit operates per block unit and the operation is the same as a random access to reduce the number of times for a transfer. Then whether it is an INPUT or an OUTPUT is tried.

When it is an INPUT, processing to the next stage, a request block address and an address of a control table in the file server are stored in a message packet and transmit a message to the file server to wait for a reply.

Then, since a termination state of an input/output operation and a content of a read block are stored in a reply message packet from the file server, a necessary record is fetched therefrom and copied in an area of a request program to be returned. Thus, the flow of when INPUT, terminates.

When it is an OUTPUT, a request block address, a control table address in a file server and a content of a block are stored in the message packet and transmit a message to the file server to wait for a reply.

Then, since a termination state of an input/output operation is stored in a message packet of a reply from the file server, a return data therefrom or the like is fetched and acknowledged thereof to return to the request program. Thus, the operation terminates. When it is not a SEQUENTIAL ACCESS, the process proceeds to a next stage and whether it is an INPUT or an OUTPUT is tried.

When it is an INPUT, processing to a next stage, a key/number of a request record and an address of a control table in the file server are stored in the message packet and transmit a message to the file server to wait for a reply.

Then, in a next stage, since a termination state of an input/output operation and a read and retrieved record are stored in a message packet of a reply from the file server, these are copied in a request program area to be returned. Thus, a flow of when INPUT terminates.

When it is an output, proceeding to a next stage, a key/number of a request record an address of a control table in the file server and a content of a record are stored in the message packet and transmit a message to the file server to wait for a reply.

Then, since a termination state of an input/output operation is stored in a message packet of a reply from the file server, a return data therefrom or the like is fetched and acknowledged to return to the request program. Thus, the operation terminates.

I claim:

1. A file access apparatus in a distributed data processing system, said distributed data processing system storing files comprising data, one of said files being accessed, and said data from one of the files being transferred, by an open instruction, said file access apparatus comprising:

a network comprising communication lines;

data modules coupled to the network via the communication lines, at least one of the data modules comprising:

a disk comprising a data domain and storing a subset of the files in the data domain, a file server coupled to the disk and transferring the data via the communication lines, said file server comprising identification means for identifying which of said data modules transmitted the open instruction a data processing unit coupled to the file server and generating and transmitting the open instruction, said data processing unit corresponding to the data domain and comprising:

an input/output processing unit coupled to the file server and transferring the data between the data processing unit and the disk by executing an input/output operation accessing the disk by directly assigning the data domain as a corresponding input/output domain; and a data transfer unit transferring the data, via the communication lines and using the open instruction, between the data processing unit of the at least one of the data modules and a file server in another of the data modules, wherein when the file server receives the open instruction, the file server determines whether the open instruction was transmitted by the data processing unit connected to the file server, determines if the data domain includes the one of the files, and transfers the data through the input/output processing unit if the data domain includes the one of the files and if the data processing unit connected to the file server transmitted the open instruction, and copies the one of the files to the data domain by transferring the data using the open instruction through the data transfer unit to the communication lines and through the file server and an input/output processing unit in the another of the data modules if a data domain storing a subset of the files stored on a disk in the another of the data modules includes the one of the files, and wherein said identification means comprises:

open instruction receiving means for receiving the open instruction to open the file on said disk;

processing module discriminator means for determining which of said data modules transmitted the open instruction;

binding processing means for enabling the data processing unit to call one of the data transfer unit and the input/output processing unit to access the file.

* * * * *

UNITED STATES PATENT AND TRADEMARK OFFICE
CERTIFICATE OF CORRECTION

PATENT NO. : 5,752,060
DATED : May 12, 1998
INVENTOR(S) : Hiroshi YOSHIDA

It is certified that error appears in the above-identified patent and that said Letters Patent is hereby corrected as shown below:

Col. 1, line 33, after "different for" insert --each--;
line 34, change "DS" to --DOS--.

Col. 2, line 45, before "or" insert --belongs,--;
line 46, delete "belongs,".

Col. 4, line 25, change "15-i" to --15-j--.

Col. 5, line 4, change "1-i" to --1-j--;
line 14, change "an" to --a--;
line 33, change "an other" to --another--;
line 36, after "FIG.5" insert --is--;
line 37, after "FIG.6" insert --is--.

Col. 8, line 54, change "," to --.--;
line 54, begin a new paragraph with --When--.

Col. 9, line 24, after "instructions" insert --,--.

Signed and Sealed this

Twenty-second Day of September, 1998

Attest:

BRUCE LEHMAN

*Attesting Officer*        *Commissioner of Patents and Trademarks*